United States Patent [19]

Mikami

[11] 4,115,813
[45] Sep. 19, 1978

[54] TELEVISION ENLARGING DISPLAY APPARATUS FOR GRAPHIC MATERIAL

[75] Inventor: Takashi Mikami, Machida, Japan

[73] Assignee: Mikami & Co., Ltd., Tokyo, Japan

[21] Appl. No.: 819,395

[22] Filed: Jul. 27, 1977

[30] Foreign Application Priority Data

Jul. 28, 1976 [JP] Japan .............................. 51-99561[U]

[51] Int. Cl.² .......................... H04N 5/65; H04N 7/18
[52] U.S. Cl. ..................................... 358/229; 358/94; 358/185; 354/80; 354/81
[58] Field of Search ................. 358/85, 287, 229, 224, 358/94, 185; 179/2 TV; 354/80, 81, 293; 355/18, 25, 66

[56] References Cited

U.S. PATENT DOCUMENTS

| 1,889,576 | 11/1932 | Snook ..................................... 358/94 |
| 3,816,646 | 6/1974 | Cimgue .................................. 358/94 |
| 3,819,855 | 6/1974 | Rush et al. ........................... 358/229 |

OTHER PUBLICATIONS

M. Lavieri, et al, A Portable Closed Circuit Television Aid For The Partially Sighted.

Primary Examiner—Robert L. Griffin
Assistant Examiner—Edward L. Coles
Attorney, Agent, or Firm—Edward H. Loveman

[57] ABSTRACT

Optical apparatus for displaying enlargements of graphic copy includes a platform carrying a television camera having an optical pickup lens. The platform is rotatable on a horizontal axis. An arm is secured to the platform and extends downwardly toward the copy. A frame is pivotably secured to the arm to bear on the copy and outline an image scanning field. A mirror is pivotably secured to the platform and is adjustable in an optical path including the lens and frame. The platform has depending legs carrying wheels or casters. A handle on the arm facilitates lifting the frame off the copy and moving the apparatus in a horizontal plane.

10 Claims, 6 Drawing Figures

TELEVISION ENLARGING DISPLAY APPARATUS FOR GRAPHIC MATERIAL

This invention relates to an optical system, and more particularly concerns apparatus for supporting a television camera while scanning graphic material beneath the apparatus.

It is conventional to provide a television camera which scans graphic material and conveys corresponding video signals to a monitor receiver in a closed circuit system. Such systems may employ the camera to enlarge images picked up from the graphic material. One such system employs a camera on a pole or boom. A monitor television receiver is connected to the camera by cable, and the enlarged images appear on the screen of the monitor receiver.

Another system employs a television camera attached to one side of a monitor receiver which is supported on an elevated platform. The lens of the camera points vertically downward and the screen of the receiver is vertical.

A further system employs a television camera attached in a horizontal position to the bottom of a television receiver supported on a elevated framework. The graphic material is placed horizontally under the camera and images are optically transmitted to the camera via a fixed angularly disposed mirror.

The above described and other similar piror systems present a number of difficulties and disadvantages i.e.:

1. Locating:

There is difficulty bringing the point or area of interest in the graphic material immediately underneath the optical axis of the camera. Until the user has found the right spot and positions the graphic material exactly under the camera axis, the user has to move the graphic material up and down and back and forth until the exact location or place to be enlarged is found. This is a very tedious and time consuming operation, which has to be repeated when the area of reading interest shifts.

2. Focusing:

When a camera is on a pole or boom, the user has to reach the camera lens to adjust it by hand. The lens may be located some distance from the graphic material, making adjustment an awkard and distracting operation. For visually handicapped persons this is very difficult to do. Further since the lens barrel usually contains rings for adjusting the diaphragm opening and for zooming, the user must adjust the focus without touching the other adjusting rings. This is also difficult to do. As the user reads and turns pages, and especially where many pages are turned, the optical distance from graphic material to lens changes so a further change in focus is required. Each time a different level is reached refocusing is required, so that the user has to readjust focus continually while using the system.

3. Flatness:

The graphic material must be kept flat in order to keep it in focus. The reader has to hold two hands on both sides of a printed page to hold it flat while using the system. It makes it difficult or impossible for the user to take notes or perform other tasks while using the prior system, since the user is occupied in holding the printed page flat.

4. Writing:

It is difficult to use prior systems for writing, so that the user can view his own handwriting enlarged, as required by some visually handicapped persons. In the prior systems there is difficulty in placing pen, paper and hand directly underneath the optical axis of the camera, and of staying in the correct area.

5. Simplicity and Fortability:

All the systems of the prior art described are complicated and expensive, and they are bulky, heavy and unsuitable for carrying.

It is therefore the principal object of the present invention to provide a display system for graphic material which includes a movable carriage for supporting a television camera, and an arm connected to the carriage and carrying a rectangular frame outlining the picture field scanned by the camera with a separate monitor display receiver connected to the camera by a flexible cable.

Another object of the present invention is to provide a graphic display system as described, whereby any graphic material outlined by the picture field frame is properly located for scanning, so that relocation of the carriage is not required as reading proceeds.

A further object of the present invention is to provide a graphic display system as described whereby all graphic material outlined by the picture field frame and lying in the plane at the bottom of the frame is automatically properly focused so that refocuing is not required as pages are turned.

Another object of the present invention is to provide a graphic display system as described, wherein the picture field frame can be used as a writing guide, with the user resetting the writing hand on or near one side of the frame, or aligning a writing instrument with one side of the frame.

A further object of the present invention is to provide a simplified graphic system or apparatus as described in which a handle is provided for lifting the picture frame field and carriage supporting the scanning camera over graphic material to be read or written.

These and other objects and many of the attendant advantages of this invention will be readily appreciated as the same becomes better understood by reference to the following detailed description when considered in connection with the accompanying drawings in which.

Figure 1:
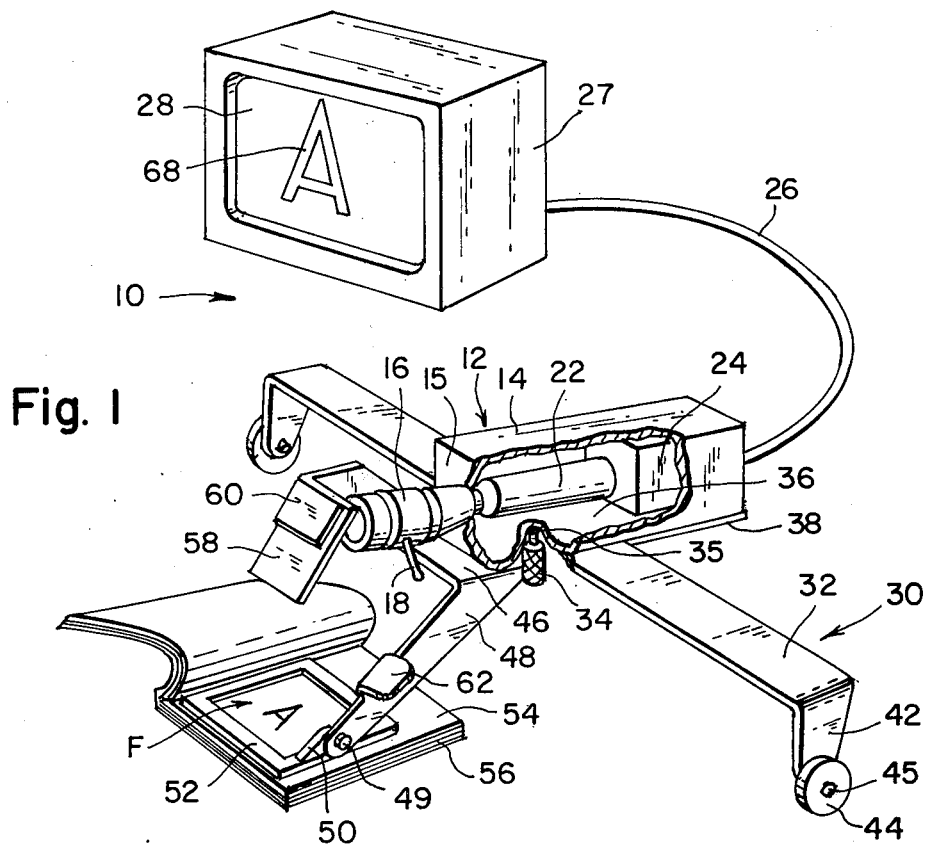
FIG. 1 is a perspective view of apparatus embodying the present invention comprising a television system for enlarging and displaying graphic material, with part of the television camera broken away.
Figure 2:
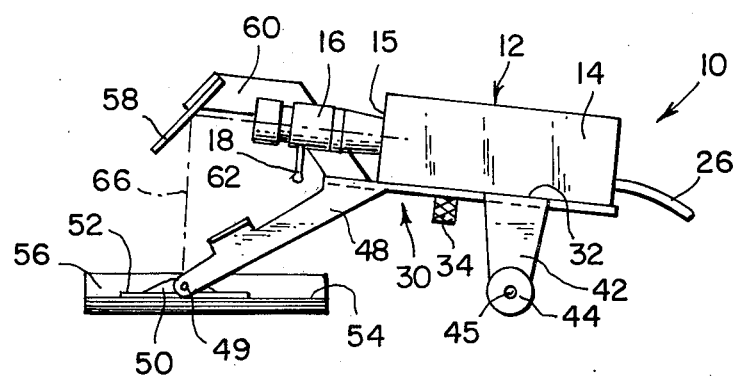
FIG. 2 is a reduced side view of part of the apparatus of FIG. 1.

Referring now to the drawing wherein like reference characters designate like or corresponding parts throughout, there is illustrated in FIGS. 1 and 2, grapich display apparatus generally designated as reference numeral 10 including a television camera 12 having a rectangular closed housing 14. Projecting from a front wall 15 of the housing 14 is a lens 16 here shown as a zoom lens having an adjustment handle 18. Aligned with the lens 16 inside the housing 14 is an image sensor tube and coil assembly 22 connected to an electric circuit box 24. A flexible cable 26 is connected from the circuit box 24 to a separate television monitor receiver 27 having a viewing screen 28. To the extent described the components are largely conventional.

Figure 3:
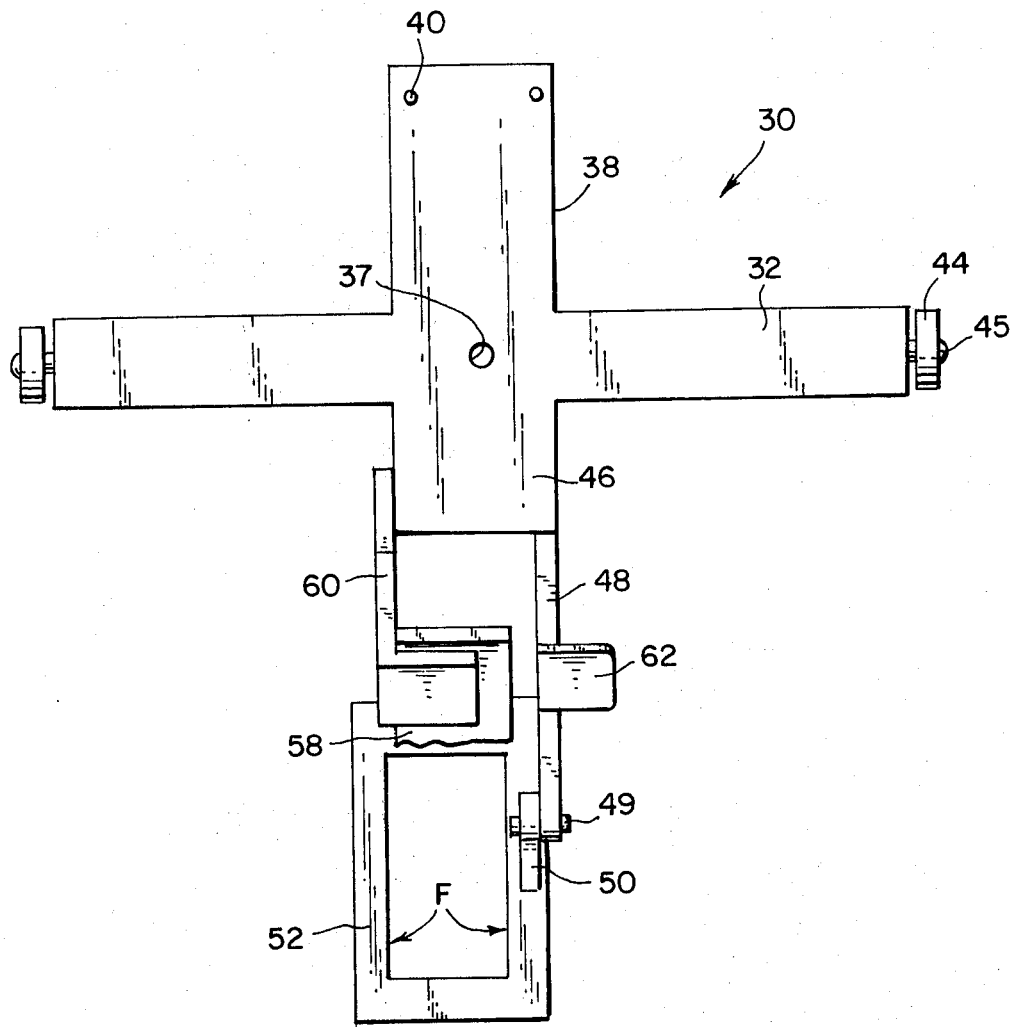
FIG. 3 is a perspective view similar to FIG. 1 showing a modification of the invention.

Now according to the invention, the camera 12 is mounted on a carriage generally designated as reference numeral 30 which includes a flat elongated cross plate 32 providing a support platform for the housing 14; see FIG. 3. A hand screw 34 has a shank 35 extended through a hole 37 in the plate 32 and threaded into a threaded hole not shown in the bottom wall 36 of the housing 14. A plate extension 38 extends rearwardly of the plate 32 and is integral therewith. The plate extension 38 supports the rear portion of the housing 14. A pair of pins 40 on the plate extension 38 engage in corresponding holes in the bottom of the housing 14 to stabilize the camera 12 on the carriage 30. A pair of legs 42 extend downwardly at opposite ends of the plate 32 and each engage a rotatable wheel or caster 44 journaled on a pin 45.

A forward extension 46 of the plate 32 supports a downwardly inclined arm 48. The lower end of the arm 48 is pivotally secured by a pin 49 to an ear 50 which extends upwardly from one side of a rectangular frame 52. The frame 52 may be disposed horizontally on a page 54 of a book 56 for defining a rectangular scanned image field F of the apparatus; see FIGS. 1, 2, 3.

A mirror 58 or other optical reflector is secured to an angle bracket 60 which is secured to one side of the forward plate extension 46. A handle bar or plate 62 is secured to the arm 48 to facilitate lifting the frame 52. The frame 52 assists in stabilizing the assembly when in operation position.

In operation, the frame 52 is disposed on the page 54 of the book 56 to be read by means of the apparatus. The frame 52 encloses the graphic copy field F here shown containing the letters "A." The frame 52 presses down on the page 54 holding it flat. The page 54 is disposed in the plane of the flat bottom of the frame 52. The angularly disposed mirror 58 picks up the image in the graphic copy field "F" and reflects it to the lens 16 via an optical path 66; see FIG. 2. There the optical image is converted to video signals and amplified electronically in conventional fashion. The amplified signals are transmitted to the monitor receiver 27 via the cable 26. The image of the scanned letter "A" appears visibly as an enlarged image 68 on the screen 28.

The focus of the lens 16 is set to bring a clear image to the tube 22 of any printed or other graphic matter placed immediately underneath the frame 52 within the area of the copy field "F" outlined by the frame 52. Refocusing is not necessary after the picture frame 52 is placed on the page 54. The only adjustment which may be required may be a zooming adjustment for enlarging purposes accomplished by rotating the handle 18. The handle 62 on the arm 48 is used to raise or push back the apparatus when the user turns pages of a book or replaces the graphic copy to be scannned. The handle 62 may also be used to move or turn the carriage 30 laterally. If the object to be scanned is irregularly shaped the frame 52 may be rotated on the pin 49 to lie flat on the object. Focus is maintained despite any change in thickness of the book or other object being scanned since the focus is based on the bottom plane of the frame 52.

Figure 4:
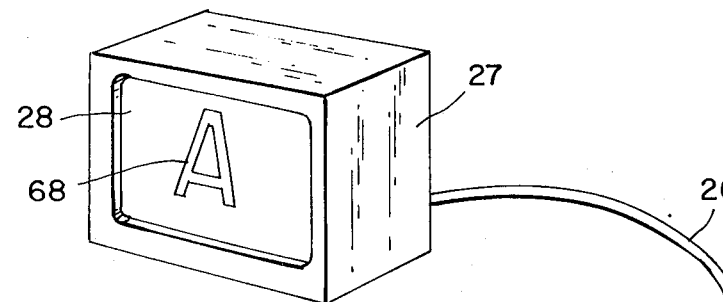
FIG. 4 is an enlarged top plan view of the carriage per se.
Figure 5:
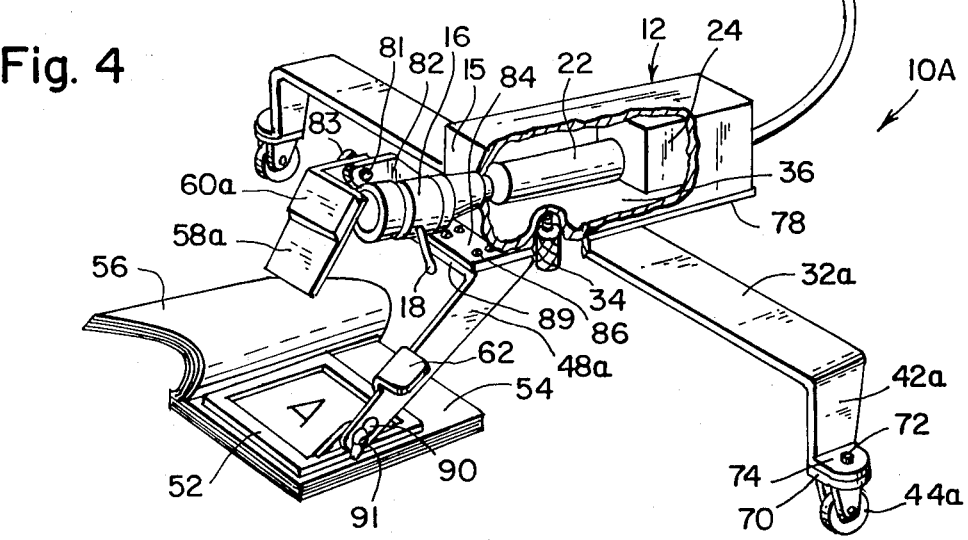
FIG. 5 is a reduced side view of part of the apparatus of FIG. 4.
Figure 5:
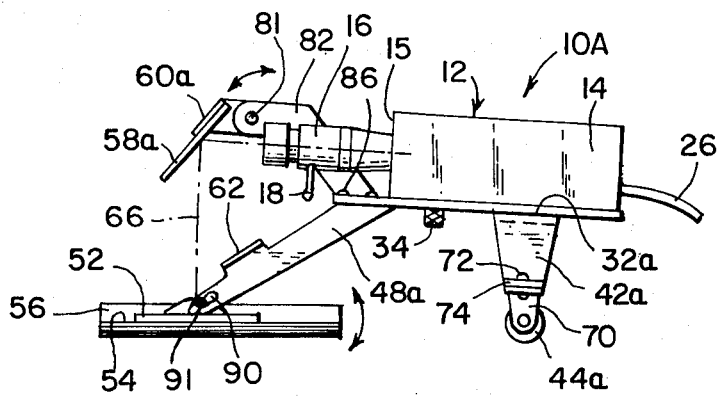
Figure 6:
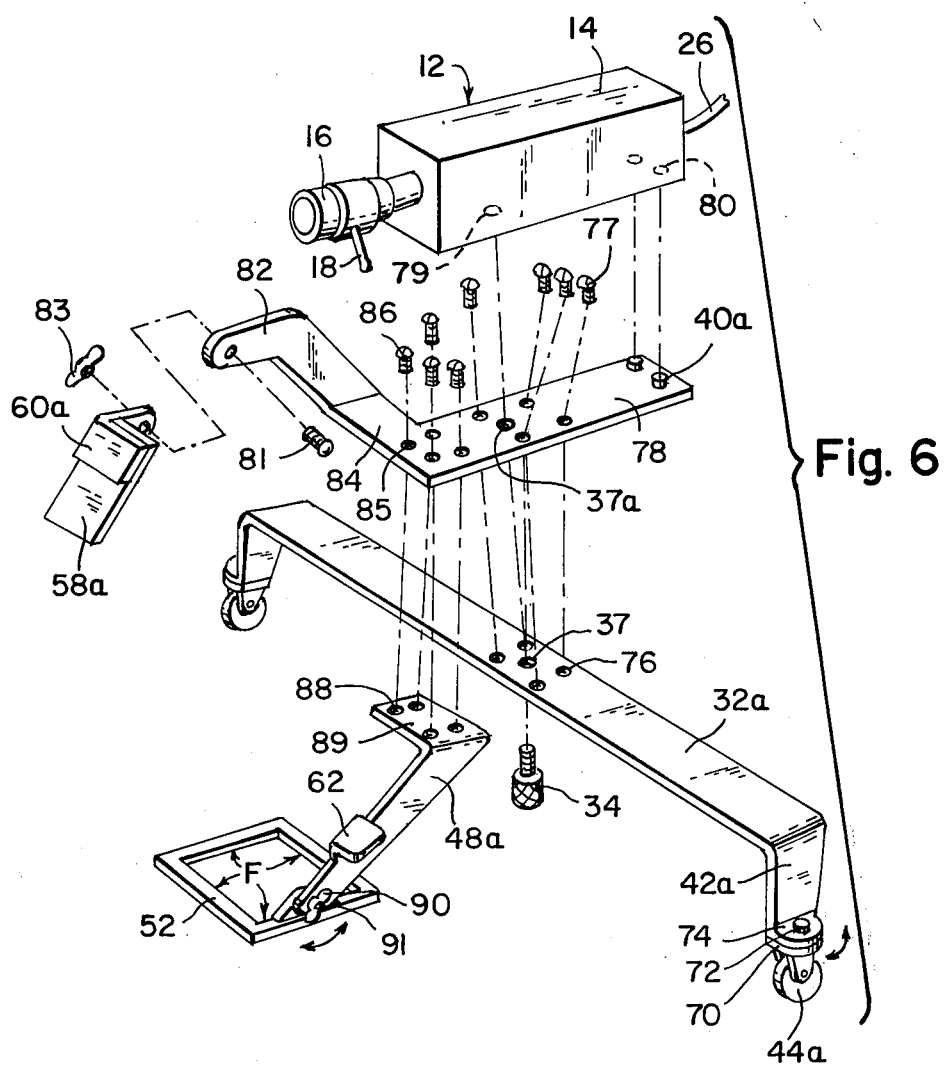
FIG. 6 is an exploded perspective view of parts of the apparatus shown in FIG. 4.

In FIGS. 4, 5 and 6 is shown another apparatus generally designated as reference numeral 10 similar to the apparatus 10 but embodying certain modifications of the invention. In apparatus 10A, the casters 44a are swivelly mounted on brackets 70 which pivot on pins 72 secured to laterally extending ears 74 at ends of carriage legs 42a. Carriage plate 32a is rectangular and is provided with threaded holes 76 around the hole 37 to receive screws 77. These screws secure an L-shaped flat plate 78 to the top of the plate 32a. The plate 78 has a hole 37a registering with the hole 37 to engage the hand screw 34. Hand screw 34 engages in a hole 79 in the bottom of the camera housing 14. Pins 40a on the plate 78 engage in holes 80 in the bottom of the camera housing 14. The plate 78 extends rearwardly of the plate 32 to support the rear portion of the camera 12, like the plate extension 38 in the apparatus 10.

Angle bracket 60a is pivotally secured by a screw 81 and a wing nut 83 to a bracket 82 on a laterally extending arm 84 of the plate 78 for adjusting and then fixing mirror 58a in position. The mirror 58a is secured to the inner side of the bracket 60a The front portion of the plate 78 which extends forwardly of the plate 32 is provided with holes 85 to receive screws 86 which engage in threaded holes 88 in a bracket plate 89 at the top of the carriage arm 48a. A wing nut 90 on a screw 92 pivotally holds the frame 52 on the lower end of the arm 48a.

Apparatus 10A operates like the apparatus 10 as described above. Apparatus 10A may be quickly taken apart for convenient storage and/or transportation, by removing the several screws. The swivel arrangement of casters 44a facilitates rotating the apparatus horizontally when positioning it in place over copy to be scanned.

It may now be emphasized that the apparatus 10 and 10A both show the user the exact area which is in the scanning field F of the camera 12 as outlined by the frame 52. Focusing of the lens 16 once done need not be repeated. If the apparatus is to scan copy material in a typewriter, the carriage may be lifted and placed on the typewriter. Both the frame 52 and the mirror 58 or 58a may be rotated to correct angular positions for reflecting the scanned image to the camera lens 16.

The apparatus may be used for reading as well as writing graphic copy. The sides of the frame 52 can be used as guides for the hand or for writing instruments. Since the monitor 27 is located away from the scanning camera and is connected only by a short flexible cable 26, the receiver may be located where it can be viewed most comfortably and conveniently by the user, and need not be placed directly in front of the user over the scanned copy as in prior display systems.

It should be understood that the foregoing relates to only a limited number of preferred embodiments of the invention which have been by way of example only and that it is intended to cover all changes and modifications of the examples of the invention herein chosen for the purposes of the disclosure, which do not constitute departures from the spirit and scope of the invention.

The invention claimed is:

1. Optical apparatus for displaying enlargements of a graphic copy, comprising:
   a television camera having a lens for picking up an optical image from said graphic copy;
   a platform means carrying said camera in an elevated position above said graphic copy and rotatable on a horizontal axis to lift said camera;
   an arm secured to said platform means and extending downwardly therefrom toward said copy;
   a frame means secured to said arm and disposed to bear on said copy and to outline a scanning field on said copy, whereby said frame means is lifted off said copy when said platform means and said arm are rotated on said horizontal axis; and an image reflector means supported by said platform means and disposed in an optical path between said frame and said lens for transmitting an image of said copy to said lens.

2. Optical apparatus as defined in claim 1, further comprising:

a television monitor receiver having an image display screen; and a flexible cable means connecting said camera and said receiver for conveying video signals from said camera to said receiver corresponding to said image of said copy.

3. Optical apparatus as defined in claim 1, wherein said platform means comprises an elongated flat plate having depending legs at opposite ends; and wheel means rotatably secured to said legs for movably supporting said platform means.

4. Optical apparatus as defined in claim 3, wherein said wheel means are casters swivelly arranged to turn on vertical axes to facilitate moving said apparatus in a horizontal plane.

5. Optical apparatus as defined in claim 3, further comprising handle means on said arm to facilitate lifting said platform means, said arm and said frame means with respect to said copy.

6. Optical apparatus as defined in claim 5, further comprising bracket means pivotally secured to said platform means and carrying said image reflector means for adjusting the same angularly in said optical path.

7. Optical apparatus as defined in claim 6, further comprising an attachment means pivotally securing said frame means to said arm for adjusting said frame means to bear on said copy to define said scanning field.

8. Optical apparatus as defined in claim 7, wherein said platform means further comprises an L-shaped plate removably secured to said elongated flat plate; and screw means detachably securing said arm and said bracket means to said L-shaped plate, whereby said platform means may be disassembled for transportation and storage, and quickly reassembled for use.

9. Optical apparatus as defined in claim 8, wherein said casters are swivelly arranged to turn on vertical axes to facilitate moving said apparatus in a horizontal plane.

10. Optical apparatus as defined in claim 9, further comprising:

a television monitor receiver having an image display screen; and a flexible cable means connecting said camera and said receiver for conveying video signals from said camera to said receiver corresponding to said image of said copy.

* * * * *